INVENTOR.
JAMES S. HYDE
BY Wm J. Nolan
ATTORNEY

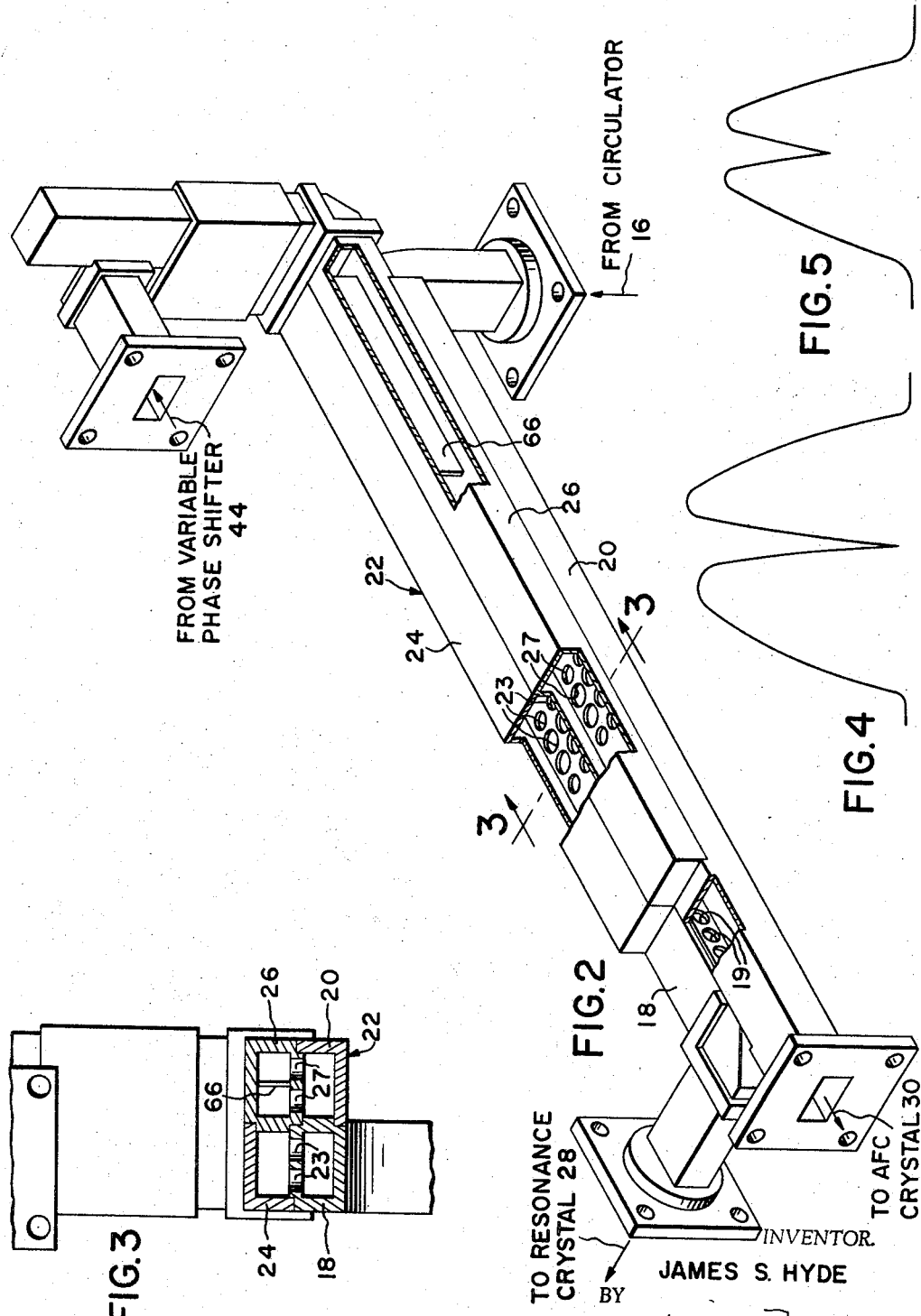

United States Patent Office 3,350,633
Patented Oct. 31, 1967

3,350,633
GYROMAGNETIC SPECTROMETER HAVING SEPARATE DISPERSION AND ABSORPTION MODE DETECTORS
James S. Hyde, Menlo Park, Calif., assignor to Varian Associates, Palo Alto, Calif., a corporation of California
Continuation of abandoned application Ser. No. 323,041, Nov. 12, 1963. This application Apr. 18, 1966, Ser. No. 543,420
10 Claims. (Cl. 324—.5)

ABSTRACT OF THE DISCLOSURE

A gyromagnetic resonance spectrometer is disclosed which is especially suited for obtaining electron paramagnetic resonance spectra. The spectrometer includes a source of microwave power which is split into two channels, a reference channel and a resonance channel. The resonance channel includes a bridge network with a sample cavity in one arm thereof. Resonance of the sample in the cavity produces unbalance of the bridge and a resonance output in one arm thereof which is connected to one input of a microwave mixer for comparison with the output of the reference channel which is connected to another input of the mixer. The mixer includes two detectors. The reference signal and resonance signals are combined in the detectors for detection of the dispersion mode of the sample in one detector and for detecting the absorption mode of the sample in the other detector. A 90° phase shifter in the mixer shifts the reference signals by 90° as combined in the two detectors.

In a preferred embodiment, a power splitter is employed in the resonance signal channel of the mixer for applying a higher percentage of the resonance signal to the absorption mode detector than to the dispersion mode detector. The sample resonance is observed from the absorption mode detector, whereas the output of the dispersion mode detector is utilized for frequency control of the spectrometer.

This application is a continuation of my copending application Ser. No. 323,041, filed Nov. 12, 1963, now abandoned.

This invention relates in general to gyromagnetic resonance and, more particularly, to an improved system for observing and measuring electron paramagnetic resonance (EPR) signals.

A brief analysis of known EPR theory and operation reveals that electrons behave according to the Larmor theorem when subjected to a magnetic field because the electrons possess both a magnetic momentum and angular momentum, that is, an electron precesses about the field axis at a frequent directly proportional to the field strength. If a sample to be analyzed, which contains unpaired electrons, is simultaneously subjected to a dc magnetic field and irradiated by a relatively weaker radio frequency (R.F.) magnetic field at the frequency of precession, then electron resonance occurs. Spectrometer systems utilize this phenomenon of electron paramagnetic resonance for observing, detecting, and measuring the structures and changes of atomic and molecular particles, among other things.

More specifically, the absorption mode of the dispersion mode of an EPR signal is observed to determine the characteristics of a sample under analysis. These signal modes have also been called "$v$" and "$u$" modes in a notation introduced by F. Bloch, in the Physical Review, volume 70, page 460, 1946. Other authors have called these signal modes the imaginary and real parts of the complex R.F. magnetic susceptibility, and have used the notation $\chi'$ and $\chi''$. It is customary, for reasons of sensitivity, to place a sample to be analyzed in the region of maximum R.F. magnetic field intensity of a resonant structure, such as a resonant cavity designed for microwave frequencies. When gyromagnetic resonance occurs, the absorption signal mode will result from a change in the cavity Q or quality factor, and the dispersion signal mode will result from a change in the resonant frequency of the cavity. At a detection point, as for example, a microwave diode, where the radio frequency voltage is rectified, the absorption and dispersion signal modes are characterized by radio frequency voltages in quadrature with each other.

The magnetic resonance signal modes can be measured by applying a radio frequency magnetic field to a sample of matter that is disposed within a polarized magnetic field, and which receives a sweep signal that causes the sample to pass through gyromagnetic resonance. Both signal modes occur at the detection point simultaneously. By arranging a coherent reference microwave voltage of variable phase at the detection point of amplitude much larger than the signal modes, it is possible to detect pure absorption or pure dispersion. That signal mode will be detected which is in phase with the reference voltage.

Observation of the absorption mode aids in the interpretation of complex, multi-line resonance characteristics, while observation of the dispersion mode serves to locate weak, unknown resonance signals and is useful in the technique known as electron nuclear double resonance (see G. Feher, Phys. Rev. 103,501 (1956). Thus it would be desirable to have both modes available for observation. Further description and explanation of the subject may be found in the textbook "NMR and EPR Spectroscopy," authored by the NMR-EPR staff of Varian Associates, and published by the Permagon Press in 1960, particularly with reference to chapters 1, 3, 5 and 6.

In U.S. Patent 3,090,003, entitled, "Gyromagnetic Resonance Method and Apparatus," assigned to the same assignee, there is described a spectrometer apparatus wherein a novel microwave bridge network affords observation of both the absorption and dispersion modes. This patented apparatus employs an automatic frequency control (AFC) network to hold the frequency of the signals from the microwave source at the resonant frequency of a reference cavity. The resonant frequency of the sample cavity is adjusted to be the same as that of the reference cavity. There is only one microwave detector, but this apparatus is so arranged that the power incident on the sample cavity is considerably less than the power incident on the reference cavity. This is desirable so that the AFC network will hold the frequency of the signal from the microwave power source primarily to the reference cavity rather than the sample cavity. A variable phase shifter permits the detection of dispersion or absorption. However, with such apparatus it is not possible to observe the dispersion mode at a full power output of the microwave energy source, since attenuation means is coupled between the microwave source and the cavity holding the sample to reduce the microwave energy by an appreciable amount.

It would be desirable to utilize a maximum of the power derived from the source, especially when analyzing samples having a short relaxation time, so that a high signal-to-noise ratio may be realized.

Furthermore, with such apparatus it has proven difficult to adjust the variable phase shifter in a manner such that the dispersion or absorption signal modes can unambiguously be detected. Often a mixture of the two modes exists because the reference microwave voltage is not exactly in phase with the desired signal mode, and trial and error changes of the variable phase shifter are necessary to obtain a pure signal mode.

The object of this invention is to provide a novel and improved gyromagnetic resonance spectrometer.

One feature of this invention is the provision of a gyromagnetic resonance apparatus wherein either the absorption or dispersion modes may be observed, utilizing substantially all of the power supplied from a microwave signal source.

Another feature is the provision of an EPR apparatus having an AFC network which holds the power source to the resonant frequency of the resonant structure containing the material to be analyzed, and one that affords viewing the dispersion mode at high as well as low power levels.

Another feature is the provision of an EPR apparatus having an AFC network in which either pure absorption or pure dispersion signal modes may unambiguously be detected.

According to this invention, a gyromagnetic resonance spectrometer comprises a resonant structure containing a sample of matter to be analyzed, a radio frequency (R.F.), power source that supplies power to such resonant structure, and means for stabilizing the frequency of the power source to the resonant frequency of the sample containing structure. Gyromagnetic resonance signals derived from the sample are detected in a unique mixer assembly comprising a plurality of R.F. detectors, a phase shifter, and a plurality of R.F. power couplers. The gyromagnetic resonance signals are mixed in this assembly with a reference signal derived from the R.F. power source through a variable phase shifter.

During the operation of the inventive apparatus, it is desirable to modulate the gyromagnetic resonance in some manner, as for example by modulation of the polarizing magnetic field, which results in an A-C modulation of the gyromagnetic resonance signals. In addition, provision for frequency stabilization of the power source to the resonant structure results in a modulation of the R.F. level at the mixer assembly at some frequency, which differs from the frequency used to modulate gyromagnetic resonance. This invention comprises a unique signal mode selector, including a multipole switch and a filter circuit for properly switching and filtering these different frequencies, following R.F. detection at the various R.F. detectors, in such a manner that dispersion or absorption signal modes can be unambiguously detected.

The invention will be described in greater detail with reference to the accompanying drawings in which:

FIGURE 2 is an isometric view, partly broken away, of a novel mixer assembly utilized in the apparatus of FIGURE 1;

FIGURE 3 is a cross-section view of a portion of the mixer assembly taken along lines 3—3 of FIGURE 2;

FIGURE 4 is a plot depicting a symmetric klystron mode signal with centered matched cavity dip, observed on an oscilloscope;

FIGURE 5 is a plot illustrating a symmetric mode signal obtained for an observed dispersion mode with correct phasing of the reference signal.

Figure 1:
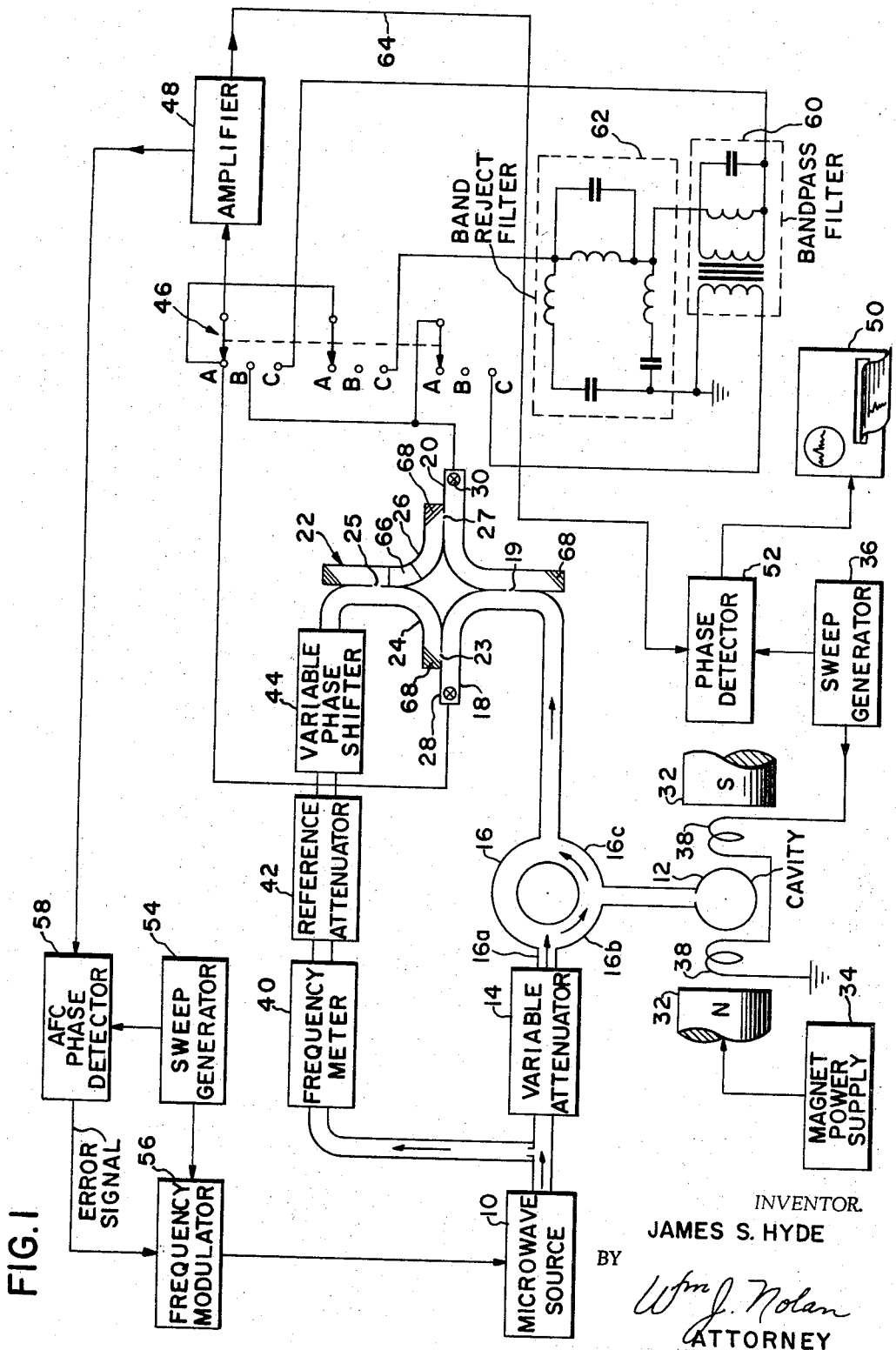
FIGURE 1 is a schematic and block diagram of a gyromagnetic resonance apparatus in accordance with this invention.

With reference to FIGURE 1, a high frequency or microwave source 10, such as klystron oscillator, for example, operating at 35 kmc. per second, supplies microwave power to a resonant structure or cavity 12 containing a sample of matter under analysis. The klystron output may be 100 milliwatts of power tunable over 1000 megacycles, for example, and serves to irradiate the sample. Coupled between the source 10 and the sample cavity 12, are, respectively, a variable attenuator 14 for controlling the level of the microwave signal supplied to the sample cavity and a circulator 16, which may be a unidirectional ferrite device of the Faraday rotation type having ports 16a 16b, and 16c for channeling the microwave power to and from the cavity. The attenuator 14 may be of the rotary vane type, which is characterized by a zero phase shift. The attenuator 14 serves to prevent saturation and to adjust the level of microwave power applied to the cavity 12 for magnetic resonance.

The microwave power is received from the variable attenuator 14 by port 16a and all of the attenuated signal is directed through port 16b to the sample cavity 12. A gyromagnetic resonance signal is reflected from the cavity 12 and all of the reflected signal is passed through a port 16c to coupled mixer arms or waveguide sections 18 and 20 of a mixer assembly 22. The mixer assembly 22 includes two other coupled arms or waveguide sections 24 and 26, which are coupled by coupling means 25, whereas the arms 18 and 20 are coupled by coupling means 19. The arms 18 and 24 are also coupled by coupling means 23, while the arms 20 and 26 are coupled by coupling means 27. The mixer arms 18 and 20 have crystal detectors 28 and 30, respectively, positioned at the ends thereof. Hereinafter, the crystal detector 28 will at times be referred to as the "Resonance Crystal" and the crystal detector 30 will be called the "AFC Crystal."

The cavity resonator 12 is positioned within a polarizing magnetic field $H_o$ for, example, about 3400 gauss, that is produced by a magnet 32, which may be either of the permanent or electromagnet type. If an electromagnet is used, a magnet power supply 34 serves to supply energy to the magnet 32. In operation, a sweep generator 36 provides a sweep signal at some alternating frequency, as for example a frequency of 100 kilocycles per second, or, alternatively, a low audio frequency, to the sample cavity, whereby the sample under analysis is cyclically passed through gyromagnetic resonance as a result of the modulation of the polarizing field of the magnet 32. The sweep generator 36 applies the sweep signal to a pair of suitable electromagnetic coils 38 that encompass the sample cavity 12.

The microwave source 10 also supplies a portion of its power output through a reference loop to the coupled bridge or waveguide sections 24 and 26. The reference loop provides a reference voltage at the detectors 28 and 30 and includes a frequency meter 40 for indicating the frequency of the reference microwave voltage received from the klystron 10, a reference attenuator 42 that varies the amplitude of the reference voltage and causes the detectors to operate in the linear range with optimum conversion gain, and a variable phase shifter 44 that enables varying the phase of the reference voltage relative to the phase of the output signal received from the bridge 22 from the cavity 12. The phase of the reference voltage may be varied through a full 360° range, and may be adjusted so that the observed klystron mode sweep signal, which is modified by a dip arising from microwave power absorption by the sample cavity, is symmetrical. Provision to display the klystron mode sweep is not shown in FIGURE 1 for the purpose of convenience, but is accomplished in practice by applying an audio frequency signal of sufficiently large amplitude to the microwave source 10 to drive it back and forth through its mode of oscillation. The resulting output signal of either crystal detector 28 or 30 may be displayed on an oscilloscope. The adjustment of the variable phase shifter 44, by observation of a display sweep signal, is achieved prior to readout of the absorption or dispersion modes. During such adjustment, the automatic frequency control network referred to hereinafter, is inoperative.

The reflected signal from the cavity 12 in the arms 18 and 20 and the reference voltage from the reference loop in the arms 24 and 26 are mixed in the arms of the bridge 22, detected by detectors 28 and 30, and passed to a signal mode selector comprising a ganged switch 46. The mixer assembly 22 and switch 46 in combination afford unambiguous observation of either the dispersion or absorption signals. The ganged switch 46 is a three pole ganged switch providing three functions A, B, and C, with corresponding switch positions. For absorption mode detection, the switch is set at position A and is coupled to the resonance crystal detector 28. In the switch position A, the signal derived from the mixer 22 is fed to an amplifier 48 and the amplified signal is directed to a recorder or oscilloscope 50 through a phase sensitive detector 52. At the same time, the phase detector 52 receives a reference signal from the generator 36 and serves to average out random and transient signals.

In position A, the output signal from the amplifier 48 is also directed to an automatic frequency control (AFC) network, which is employed to maintain the output signal from the klystron 10 at the resonant frequency of the sample cavity 12. The AFC network includes a sweep generator 54 that supplies a relatively high audio frequency sinusoidal sweep signal, for example 10 kilocycles per second and in any event, a frequency different from that used to modulate the D-C polarizing magnetic field, to a suitable frequency modulator 56. The modulator 56 serves to frequency modulate the output of the klystron 10 for substantially equal frequency deviation above and below the center frequency thereof. The frequency modulated output of the klystron 10 is fed to the sample cavity 12 which is tuned to the desired frequency of the klystron oscillator 10.

When the center frequency of the klystron oscillator 10 is precisely at the center frequency of the sample cavity 12, there will be energy absorbed by the cavity from the klystron twice during each frequency modulation sweep cycle. This double absorption per sweep cycle of the oscillator 10 produces a strong second harmonic of the 10 kc. sweep signal in the output signals of the crystal detectors 28 and 30. With the frequency of the klystron 10 locked to that of the sample cavity 12, the pure absorption mode may be unambiguously detected. The resonance crystal detector 28 senses the resonance information as well as the AFC information, thereby obtaining a pure absorption mode signal. This is true regardless of the setting of the variable phase shifter 44, but it will be found that maximum gyromagnetic resonance signal amplitude will occur when the variable phase shifter 44 is adjusted so that there is no D-C error signal applied by the AFC network to the microwave source 10. Thus, with the ganged switch 46 in position A, the klystron mode sweep display with sample cavity absorption dip should be symmetrical.

On the other hand, if the center frequency of the klystron oscillator 10 is not at the center frequency of the sample cavity 12, the cavity will have only one maximum absorption from the oscillator per cycle of the frequency modulation sweep. This means that there will be a substantial fundamental component at the frequency modulation sweep frequency produced in the output signal of the crystal detectors 28 and 30. The phase and magnitude of this fundamental component will depend upon the sense and degree that the frequency of the klystron oscillator is above or below the center frequency of the sample cavity. The fundamental error signal is amplified in the amplifier 48 and fed to a frequency control phase sensitive detector 58, wherein it is compared with a reference signal derived from the sweep generator 36 to obtain a D-C error signal. The error signal is applied to the frequency modulator 56 for centering the frequency of the klystron oscillator 10 with respect to the frequency of the sample cavity 12.

It is customary to speak of the real and imaginary components of the microwave voltage reflected from a resonant cavity. These two components being in quadrature with respect to each other. It is also true that real and imaginary components of the gyromagnetic resonance microwave voltages will be in phase with the respective real and imaginary components of the microwave voltage reflected from the resonant cavity 12. If the phase of the reference voltage is adjusted to obtain a symmetrical klystron mode sweep display, then the reference voltage will be in phase with respect to the imaginary or absorption component of both the gyromagnetic resonance signal mode and microwave voltage reflected from the resonant cavity.

To observe the pure dispersion mode, the operator first sets the ganged switch 46 at position B, which is used only for alignment, and the variable phase shifter 44 is adjusted while observing the mode sweep signal on the oscilloscope 50 to obtain a symmetrical mode such as illustrated in FIGURE 5. In position B, all signals incident on the AFC crystal detector 30 are passed through the amplifier 48, whereas all the signals that appear at the resonance crystal 28 are rejected. The switch 46 is then moved to position C, thereby coupling both detectors 28 and 30 to the amplifier 48, enabling observation of the pure dispersion mode.

In position C, the filter network, which includes a band pass filter 60 and a band rejection filter 62, passes all but the 10 kilocycle AFC signal from the resonance detector crystal 28 to the amplifier 48 through the band rejection filter 62, and rejects all but the 10 kilocycle signal from the AFC crystal 30 in the band pass filter 60. The passed signals are added and transmitted simultaneously from the amplifier 48 over a coaxial transmission line 64 coupled to the phase detector 52, and the signals are directed to the recorder and scope 50 for recording and observation, as well as to the AFC phase detector 58. It is desirable that the AFC network have negligible loop gain at the frequency of the sweep generator 36.

Reference is made to FIGURES 2 and 3, which depict an embodiment of the novel mixer assembly 22 utilized in the apparatus of FIGURE 1. A feature of this particular assembly 22 is that the arms 24 and 26 have the same mechanical length, and arms 18 and 20 are of similar mechanical length, thus affording simple determination of the relative electrical path lengths of the mixer branches or arms. The four branches 18, 20, 24 and 26 constitute substantially similar waveguide sections having the same rectangular dimensions. The electrical paths associated with the coupled waveguide sections are determined by the placement of the coupling slots 19, 23, 25 and 27 which enable signal mixing.

In operation, a major portion of the signal reflected from the sample cavity 12 appears at the resonance crystal 28 associated with the arm 18, and a portion of the signal energy is split off through a 10 db power divider in the form of coupling slots 19 and is incident on the AFC crystal 30 associated within the arm 20. Concomitantly, a reference voltage is derived from the phase shifter 44 in the reference loop, and the voltage is applied to the arm 24, and through a 3 db coupler or coupling slots 25 (shown in FIGURE 1) to a fixed 90° phase shifter 66 located in the arm 26. It should be noted that the electrical path length of arm 26 differs from the electrical path length of arm 24 by 90°. The phase shifter reference voltage component is passed from arm 26 through coupling slots 27 to the mixer arm 20 and mixed with the signal component from the cavity in the arm 20; while the reference voltage component in arm 24 is passed through coupling slots 23 and mixed with the signal component in arm 18. The mixer signal components are incident on the crystal detectors 30 and 28, respectively, and are substantially 90° out of phase relative to each other at the detectors. The mixer assembly also includes load elements 68 (see FIGURE 1) positioned in the arms of the mixer assembly 22 to absorb energy and thereby provide proper impedance matching.

The phase shifter 66 is disposed in the waveguide section 26 so that the following relationship exists between the electrical path lengths of the four branches in the mixer assembly 22:

$$\psi_1 + \psi_3 = \psi_2 + \psi_4 + 90° + (\eta + 180°)$$

where $\psi_1$ is the electrical path length, in degrees, of a first waveguide section 18, between the coupling apertures 19 located between first and second waveguide sections 18 and 20, respectively, and the coupling apertures 23 located between first and third waveguide sections 18 and 24; $\psi_2$ is the electrical path length in degrees in the second waveguide section 20, between the coupling apertures 19 located between the first and second waveguide sections, 18 and 20, respectively, and the coupling apertures 27 located between the second and fourth waveguide sections 20 and 26, respectively:

$\psi_3$ is the electrical path length in the third waveguide section 24, between the coupling apertures 25 located between third and fourth waveguide sections 24 and 26 respectively and the coupling apertures 23 located between the first and third waveguide sections 18 and 24 respectively; $\psi_4$ is the electrical path length in the fourth waveguide section 26, between the coupling apertures 25 located between the third and fourth waveguide sections 24 and 26 respectively, and the coupling apertures 27 located between the second and fourth waveguide section 20 and 26 respectively; and $\eta$ is an integer. The electrical path length of a waveguide is defined as 360° times the length of the waveguide, divided by the wavelength of the electromagnetic radiation in the waveguide.

At either detector 28 or 30, the phase of the reference voltage component relative to the phase of the signal derived from the sample will determine whether absorption or dispersion is detected. Thus, if pure absorption is detected at the AFC crystal 30, pure dispersion is detected at the resonance crystal 28, and vice versa, since the respective reference voltages are in quadrature with respect to each other at the coupling points 23 and 27 where mixing with gyromagnetic resonance signal components occur. In the invention described herein, all gyromagnetic resonance information is derived from the resonance crystal 28 but AFC information is obtained from the resonance crystal 28 for observation of the absorption mode, and AFC information is obtained from the AFC crystal 30 for observation of the dispersion mode.

When operating the microwave bridge of this invention at high microwave powers, defined as powers sufficient to obtain a good signal-to-noise ratio on the AFC system, the reference attenuator 42 is set at maximum attenuation, and the variable coupling of the sample cavity 12 is adjusted, until the cavity dip on the klystron mode sweep waveform touches the scope reference baseline, as illustrated in FIGURE 4. This effectively matches the sample cavity. If the sample cavity is not matched, a microwave voltage will be reflected from the cavity and this voltage will add vectorially with the reference voltages arriving at mixing points 23 and 27 through arms 24 and 26, giving resultant reference voltage which no longer are in quadrature with respect to each other. The microwave power in the reference loop is then adjusted with the reference attenuator 42 until the detector crystals 28, 30 operate in the linear detection range corresponding to optimum conversion gain.

The bridge of this invention may be operated at high power, as well as at relatively low power. By setting the phase shifter 44 and aligning the apparatus for either the absorption or dispersion mode such that there is no AFC error at high power, then an increase in attenuation by the variable attenuator 14 in order to operate at low power levels will not affect the signal mode. It is also preferable that the variable attenuator 14 have negligible phase shift associated with it.

There has been described herein a microwave bridge which may be used in a spectrometer, having a means for providing a signal reflected from a sample cavity being swept through resonance, the reflected signal varying in amplitude and phase; and a reference loop providing two voltages 90° out of phase. By means of a plurality of detectors positioned in the arms of a mixer assembly coupled to such loops, and by means of a multipole switch and a filter network coupled between the mixer assembly and the output circuit, pure absorption or dispersion modes may be observed by simple switching.

What is claimed is:
1. In a gyromagnetic resonance spectrometer, means forming a resonator structure for containing a sample of matter to be analyzed while immersed in a unidirectional polarizing magnetic field, means forming a source of an alternating signal applied to said resonator structure for exciting said resonator structure to produce an alternating magnetic field in the sample to excite gyromagnetic resonance of the sample while immersed in the polarizing magnetic field, means forming a mixer structure having a pair of detector means therein, means forming a resonance signal channel for applying a resonance signal derived from said resonator structure to said mixer structure, means forming a reference signal channel for applying a reference signal derived from said source of alternating signal to said mixer structure, the reference signal and the resonance signal being combined in each of said detector means within said mixer means to produce a pair of output signals, means forming a phase shifter in said mixer structure for shifting the phase of the signals applied thereto from said signal and reference channels such that the reference and resonance signals are combined in one of said detector means with a certain phase relation, and the reference and resonance signals are combined in the other one of said detector means with a phase relation between them which is different from the first certain phase relation by approximately 90°, whereby when the output of one of said detector means is predominantly characteristic of the dispersion resonance mode of the sample the output of the other detector means is predominantly characteristic of the absorption resonance mode of the sample.

2. The apparatus of claim 1 wherein the spectrometer apparatus includes, means forming an automatic frequency control channel responsive to the output of one of said detector means for automatically tuning the frequency of said source means to a predetermined frequency relative to the resonant frequency of said resonator structure containing the sample under analysis.

3. The apparatus of claim 2 including, a power divider connected to divide the signal power in said resonance signal channel into two signal portions of substantially different power levels and for applying the higher power level signal to one detector means and applying the lower power level signal to the other detector means, further including means for connecting said automatic frequency control channel to the output signal of said detector means to which is applied the lower power level signal, and including means responsive to the output of said other detector means for obtaining an output representative of resonance of the sample under analysis.

4. The apparatus of claim 3 including, second phase shifting means for shifting the phase of the signals in the resonance signal channel relative to the signals in the reference signal channel, whereby pure dispersion or absorption mode output signals are obtainable by proper adjustment of said second phase shifting means.

5. The apparatus of claim 3 wherein, said automatic frequency control channel means includes, means for modulating the frequency of said source at a predetermined first frequency to produce an output tuning signal component related to the first frequency for tuning of said source, said resonance signal channel including means for modulating resonance of the sample at a second frequency to produce an output resonance signal component related to the second modulation frequency, whereby the resonance signal component and said tuning signal component are separated in frequency such that the automatic frequency control channel can be made to have negligible loop gain at the resonance signal component frequency and whereby dispersion mode resonance signals may be observed while the spectrometer is locked in frequency to the resonator containing the sample.

6. The apparatus of claim 5 including, filter means connected to the output of said lower power level detector means for passing the tuning signal component at the frequency of said tuning signal component and rejecting signal components having frequencies related to the second modulation frequency, and filter means connected to the output of said higher power level detector means for passing resonance signal components at the frequency related to said second modulation frequency and rejecting signal components having frequencies related to the first modulation frequency.

7. The apparatus of claim 3 including an amplifier for amplifying the output signals derived from said pair of detector means, and a switch means connected in circuit between said pair of detector means and said amplifier means for selecting, in one switch position, only one of the outputs of said pair of detector means for amplification by said amplifier means and for selecting, in another switch position, both outputs of said pair of detector means for amplification by said amplifier means.

8. The apparatus of claim 2 wherein, said resonator structure containing the sample is a microwave cavity resonator, and said source means of alternating signal is a microwave signal generator.

9. The apparatus of claim 1 wherein said mixer means includes a four branch network with said phase shifting means comprising a 90° phase shifter positioned in one of the branches of said mixer.

10. The apparatus of claim 1 including, the provision of a variable attenuator connected in circuit between said source of alternating signal and said resonator structure for variably adjusting the power level of the alternating signal applied to said resonator structure, and wherein said variable attenuator is characterized by introducing essentially only a negligible phase shift over its operating range of attenuation, whereby the spectrometer may be operated over a wide range of power levels without necessitating phase shift adjustments between the resonance signal and reference channels.

References Cited

UNITED STATES PATENTS

| | | | |
|---|---|---|---|
| 3,090,003 | 5/1963 | Rempel | 324—0.5 |
| 3,113,263 | 12/1963 | Collins | 324—0.5 |
| 3,265,967 | 8/1966 | Heald | 324—0.5 |

OTHER REFERENCES

Henning: The Review of Scientific Instruments, vol. 32, No. 1, January 1961, pp. 35–40.

RUDOLPH V. ROLINEC, *Primary Examiner.*

WALTER L. CARLSON, *Examiner.*

M. J. LYNCH, *Assistant Examiner.*